United States Patent
Forster et al.

(10) Patent No.: US 7,447,143 B2
(45) Date of Patent: Nov. 4, 2008

(54) RFID SECURITY DEVICE FOR OPTICAL DISC

(75) Inventors: Ian J Forster, Chelmsford (GB); Michael G Ginn, Chelmsford (GB)

(73) Assignee: Mineral Lassen LLC, Las Vegas, NV (US)

( * ) Notice: Subject to any disclaimer, the term of this patent is extended or adjusted under 35 U.S.C. 154(b) by 240 days.

(21) Appl. No.: 11/469,318

(22) Filed: Aug. 31, 2006

(65) Prior Publication Data

US 2006/0290510 A1 Dec. 28, 2006

Related U.S. Application Data

(62) Division of application No. 10/241,924, filed on Sep. 12, 2002, now Pat. No. 7,275,040.

(51) Int. Cl.
*G11B 3/70* (2006.01)
*G11B 5/84* (2006.01)
*G11B 7/26* (2006.01)

(52) U.S. Cl. ............... 369/283; 369/47.36; 369/275.4; 705/18

(58) Field of Classification Search ................ None
See application file for complete search history.

(56) References Cited

U.S. PATENT DOCUMENTS

| | | | |
|---|---|---|---|
| 5,264,877 A | 11/1993 | Hussey | |
| 5,652,838 A | 7/1997 | Lovett | |
| 5,790,489 A | 8/1998 | O'Connor | |
| 5,809,545 A | 9/1998 | Ozaki | |
| 5,862,117 A | 1/1999 | Fuentes | |
| 5,874,902 A | 2/1999 | Heinrich | |
| 5,905,798 A * | 5/1999 | Nerlikar et al. | ............... 705/57 |
| 5,909,551 A | 6/1999 | Tahara | |
| 5,995,006 A | 11/1999 | Walsh | |
| 6,034,618 A | 3/2000 | Tatebayashi | |
| 6,097,695 A | 8/2000 | Kobayashi | |
| 6,122,739 A | 9/2000 | Kutaragi | |
| 6,195,325 B1 | 2/2001 | Okanishi | |

(Continued)

FOREIGN PATENT DOCUMENTS

EP      0612037 A1      8/1994

(Continued)

OTHER PUBLICATIONS

Japanese Official Action for JP Application No. 2004-535796 dated Dec. 17, 2007, with English translation, 14 pages.

(Continued)

*Primary Examiner*—F. Zeender
*Assistant Examiner*—Christopher Buchanan
(74) *Attorney, Agent, or Firm*—Christensen O'Connor Johnson Kindness PLLC (57) ABSTRACT

An optical disc has a security feature in the form of an RFID tag that communicates with a voltage controlled optical modifier layer in the optical disc. In the presence of an interrogation signal, the RFID tag allows the optical disc to be used normally by outputting a voltage to the optical modifier layer. In the absence of an interrogation signal, the optical modifier layer prevents a laser from reading from or writing on the optical disc. Other embodiments are also disclosed.

36 Claims, 10 Drawing Sheets

U.S. PATENT DOCUMENTS

| | | |
|---|---|---|
| 6,249,227 B1 | 6/2001 | Brady |
| 6,304,971 B1 | 10/2001 | Kutaragi |
| 6,359,842 B1 | 3/2002 | Taguchi |
| 6,434,109 B2 * | 8/2002 | Rollhaus et al. ............. 369/286 |
| 6,501,435 B1 | 12/2002 | King |
| 6,902,111 B2 | 6/2005 | Han |
| 7,292,147 B2 | 11/2007 | Benedikt |
| 2002/0024905 A1 | 2/2002 | Kahlman |
| 2002/0031227 A1 | 3/2002 | Milgram |
| 2002/0196144 A1 | 12/2002 | Belka |
| 2003/0016133 A1 | 1/2003 | Egbert |
| 2003/0034400 A1 | 2/2003 | Han |
| 2004/0052202 A1 | 3/2004 | Brollier |
| 2005/0039949 A1 | 2/2005 | Kosowsky |
| 2005/0232127 A1 * | 10/2005 | Kahlman .................... 369/273 |
| 2006/0114755 A1 * | 6/2006 | Eklund, II ................ 369/13.01 |
| 2006/0220876 A1 | 10/2006 | Campero |
| 2006/0290509 A1 | 12/2006 | Forster |
| 2007/0063846 A1 | 3/2007 | Forster |
| 2007/0070867 A1 | 3/2007 | Forster |
| 2007/0115762 A1 * | 5/2007 | Wisnudel et al. ......... 369/13.56 |
| 2007/0168248 A1 | 7/2007 | Fontijn |

FOREIGN PATENT DOCUMENTS

| | | |
|---|---|---|
| EP | 0849734 B1 | 6/1998 |
| EP | 1302893 A1 | 4/2003 |
| GB | 2354834 A | 4/2001 |
| JP | 9-128408 A | 5/1997 |
| JP | 10-75198 A | 3/1998 |
| JP | 10-288727 A | 8/1998 |

OTHER PUBLICATIONS

Abcede, A., "Technological Advances Put Fast Forward on Fleet Fueling," National Petroleum News 90(7)28 34, Jul. 1998.

"Going by the Book: Woodlands Regional Library Has Installed an Electronic Library Management System Developed by ST LogiTrack," Frontline Solutions (Europe)10(8):23+, Oct. 2001.

* cited by examiner

RFID SECURITY DEVICE FOR OPTICAL DISC

FIELD OF THE INVENTION

The present invention relates to security devices for optical discs.

BACKGROUND OF THE INVENTION

Theft of intellectual property is a very prominent topic in the entertainment industries Technologies to copy audio and video recordings have plagued the industry for many years. The advent of digital recordings has, in the eyes of the entertainment industries, exacerbated the problem. In the past, analog copies got progressively worse such that eventually any copies made from the previous copy were worthless. Digital copies, each of which is just as pristine and precise as the previous copy, remove the previous limitation on repetitive copying.

While the creation of illegal copies is troublesome to the entertainment industry, equally troubling is the theft of authorized copies of the works from retail outlets, jukeboxes, and the like. Shoplifting and similar theft account for extensive lost revenue for the entertainment industry. Optical discs, such as CDs and DVDs, because of their relatively small size, are easy targets for such theft and account for a substantial portion of those losses.

Still other security concerns surround optical discs. Where the disc contains sensitive information, the loss and subsequent accessing of a disc may create problems for the person or entity whose information may be on the disc. Such information could be financial information, personal information, or confidential government information.

Thus, there remains a need for a device or technique that helps ensure that optical discs may not be read unless used in an authorized disc reader or cannot be used until after their use has been authorized.

SUMMARY OF THE INVENTION

The present invention uses a specially created optical disc. The optical disc may comprise a base layer, an aluminum layer with data carrying pits, a voltage controlled optical modifier layer, a covering layer, and a radio frequency identification (RFID) tag. The RFID tag is associated with the voltage controlled optical modifier layer such that when the RFID tag is in the presence of an appropriate electromagnetic field, the RFID tag sends instructions to the voltage controlled optical modifier layer to control the ability of an optical reader to read data on the disc.

The instructions to the voltage controlled optical modifier layer may be designed to render the optical modifier layer transparent such that the data carrying pits may be read, or may render the layer opaque such that the data carrying pits may not be read. Further, the instructions and the optical modifier layer may be designed such that once the layer has been changed, the layer remains that way. The RFID tag may be responsive to different protocols or commands such that the RFID tag causes the voltage controlled optical modifier layer to behave differently depending on the protocol or command received.

In an exemplary embodiment, the voltage controlled optical modifier layer may be formed from a liquid crystal material or other material which changes its refractive index in the presence or absence of a voltage.

The present invention has several uses, such as a security device for optical discs having sensitive information. The information may only be readable by an optical disc player that includes the appropriate type of RFID interrogator. The present invention may be used in a jukebox system such that the disc is rendered opaque unless used in an authorized jukebox. The present invention may be used as an electronic article surveillance (EAS) device in retail environments where unless the optical disc is interrogated at a cash register, the disc is unreadable. After interrogation during a sales transaction, the optical modifier layer may be instructed to become transparent such that the disc may be used normally. The present invention may also be used in pay per play activities, and software authentication and payment over a network schemes.

An alternate embodiment may combine an all optical portion of an optical disc with the RFID tag for the same security purposes If the all optical portion is not properly interrogated by a laser, the optical disc may be illegible.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
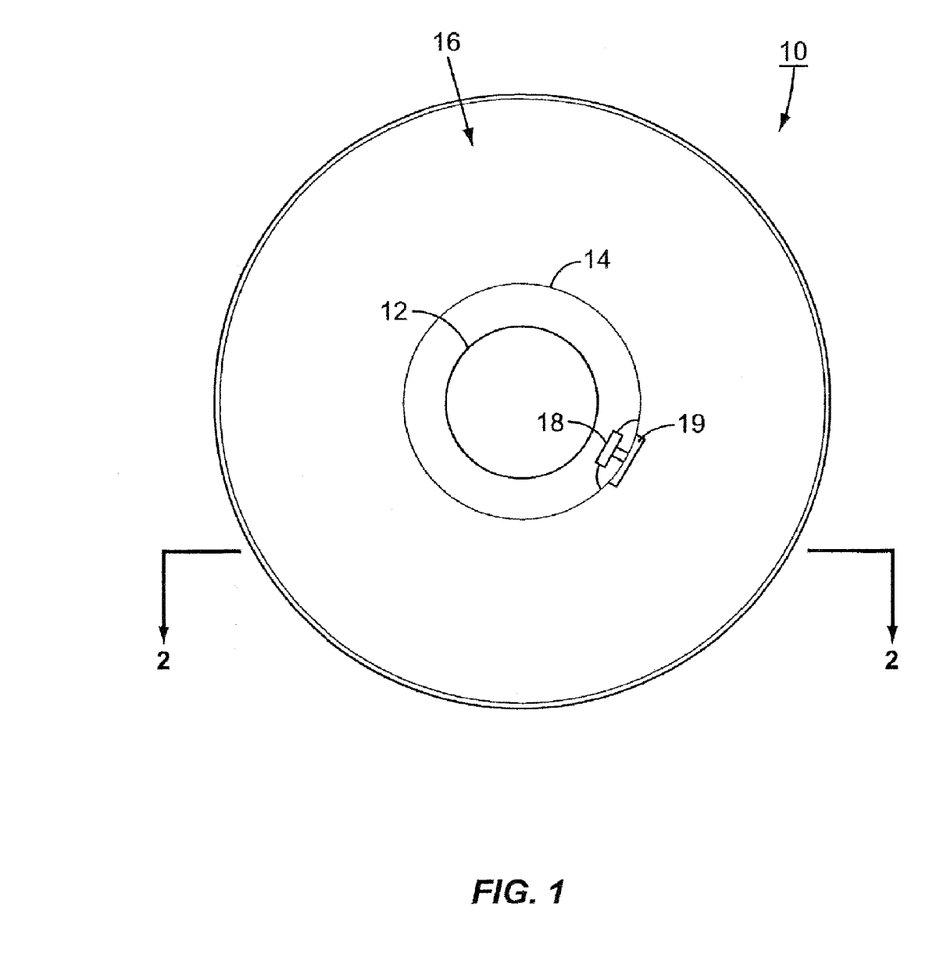
FIG. 1 illustrates an optical disc with an RFID tag disposed thereon.

The present invention is well suited for use with optical discs, such as an optical disc 10 illustrated in FIG. 1. The optical disc 10 comprises a center hole 12, a non-information bearing center annulus 14, and an information bearing annulus 16, as is well understood. The optical disc 10 may be a compact disc, a DVD, a mini disc, or the like, but is designed to store information or executable applications on the optical disc 10 for later recovery and usage by a data processing device such as a computer or audio/visual player. The optical disc 10 may further have a radio frequency identification (RFID) tag 18 positioned somewhere on the optical disc 10.

The RFID tag 18 may be comparable to the MICROINSERT or ONETAG chips previously sold by the assignee of the present invention. These devices are embodiments of U.S. patent application Ser. No. 09/618,505, filed 18 Jul. 2000 and Ser. No. 09/678,271, filed 3 Oct. 2000, both of which are hereby incorporated by reference in their entireties. These RFID tags 18 are capable of interaction with Intermec's INTELLITAG interrogators, and have been expounded upon in several commonly owned applications, such as U.S. patent application Ser. Nos. 10/125,786 and 10/125,783, both filed 18 Apr. 2002, both of which are hereby incorporated by reference in their entireties. The ONETAG and the MICROINSERT chips embody both an active and a passive sort of transponder, and both types are contemplated for use in the present invention. The RFID tag 18 may be operative at any number of frequencies, but specifically contemplated are bands centered around 125 kHz, 13.56 MHz, 915 MHz, and 2450 MHz.

In an exemplary embodiment, the RFID tag 18 is positioned on the non-information bearing center annulus 14 and uses an antenna 19 associated with the optical disc 10 according to the teachings of U.S. patent application Ser. No. 10/131,576, filed 24 Apr. 2002, which is hereby incorporated by reference in its entirety. Other antennas 19 may also be used, such as a coil antenna for low frequencies, a dipole antenna, a patch antenna, an F antenna, or the like as needed or desired. The coupling to the antenna 19 may be through any appropriate means such as electric, electromagnetic, magnetic, electrostatic, or the like using appropriate elements such as capacitive or inductive reactive elements.

Figure 2:
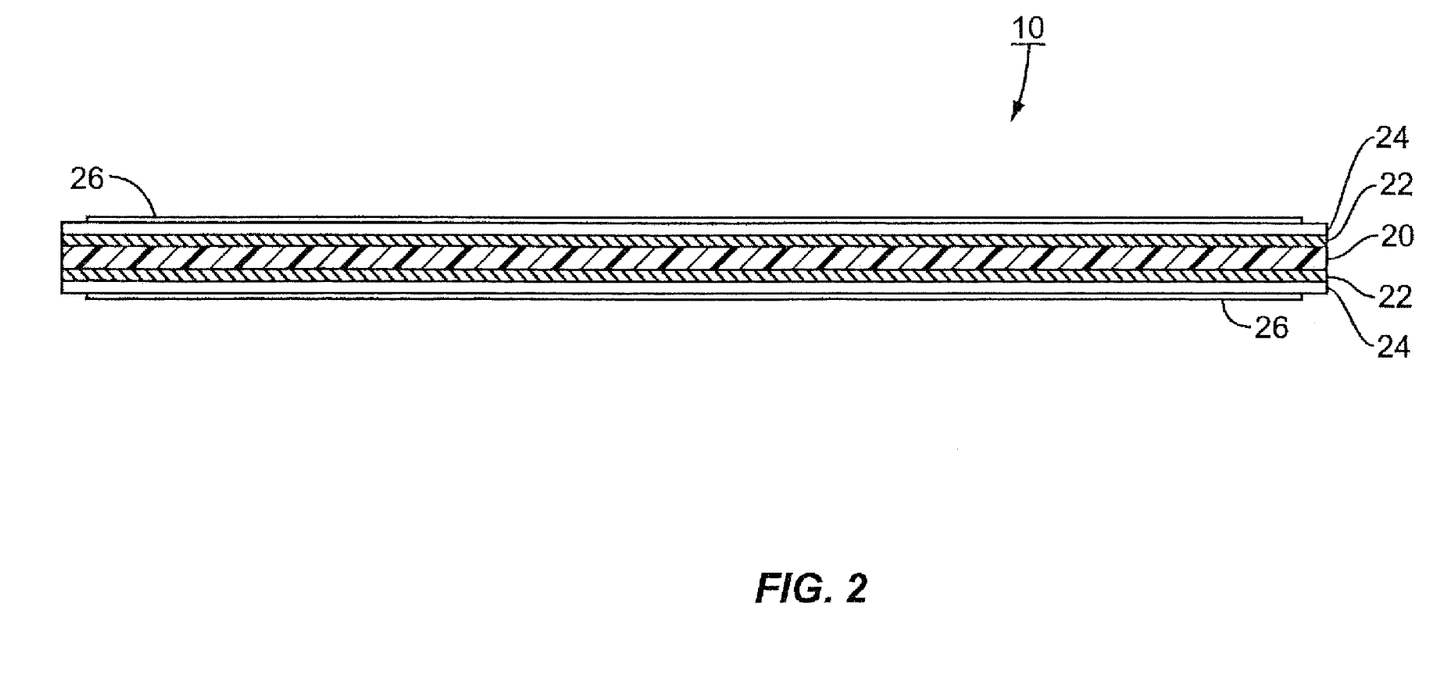
FIG. 2 illustrates a cross-sectional view of the optical disc, taken along line 2-2 of FIG. 1.

The optical disc 10 is illustrated in cross-sectional form in FIG. 2, wherein it can be seen that the optical disc 10 begins with a central polycarbonate layer 20, covered with an aluminum layer 22 having data carrying pits (not illustrated) thereon. In the event that the optical disc 10 is a double-sided DVD (illustrated), the aluminum layer 22 may be present on both sides of the polycarbonate layer 20. Associated with the aluminum layer 22 is a voltage controlled optical modifier layer 24. The voltage controlled optical modifier layer 24 is operatively connected to an output voltage provided by the RFID tag 18. The voltage controlled optical modifier layer 24 may, in an exemplary embodiment, be a liquid crystal material which scatters or alters the polarization of illumination. An appropriate liquid crystal material comprises a twisted nematic type, which can make the disc either reflective, where the laser beam passes through the liquid crystal material and can read the bits in the aluminum layer 22, or non-reflective, where the layers form a cross polarized filter. Alternatively, materials could be used which change their refractive index such that they defocus an illuminating laser spot. Other materials could be a controllable mirrored surface behind the optical layer that could control readability. As yet another option, a piezoelectric layer, such as the plastic film Polyvinyl Dienyl Flouride, could be used that distorts the surface of the optical disc 10 such that an auto-focusing laser cannot track the changes in the surface fast enough. Another option is to include an electrochromic material so that the monotone color of the laser is selectively absorbed. An example of such a electrochromic material is Lutecium diphatylocyanine.

While a plurality of materials could be used, the desired end result is that the disc is unreadable unless the RFID tag 18 has applied an output voltage to bias the voltage controlled optical modifier layer 24 properly. For more information on this topic, reference is made to Great Britain Patent GB 2,354, 834, which is hereby incorporated by reference in its entirety. The RFID tag 18 only produces the proper output voltage when the RFID tag 18 has received the proper authorization from an interrogator 32 (see FIG. 3).

Finally, capping the optical disc 10 is a covering layer 26 which protects the optical disc 10 from causal nicks, scratches and the like. Such covering layers are conventional in the industry of optical discs 10, and may be made from a polycarbonate material.

Figure 3:
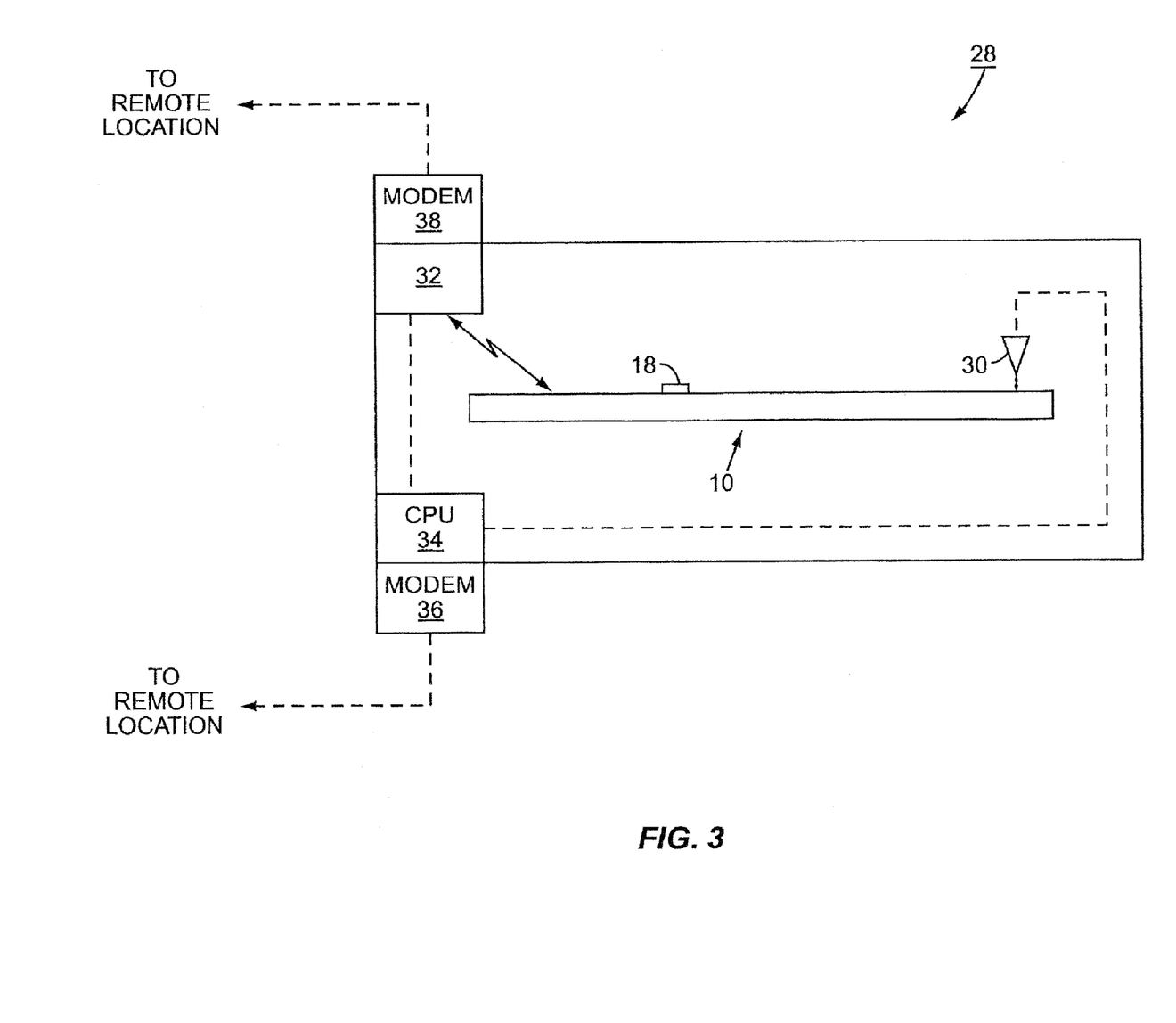
FIG. 3 illustrates a simplified disc player with an RFID interrogator.

An example of the optical disc 10 in use is illustrated in FIG. 3, wherein an optical disc player 28 includes a laser head 30 that reads from and/or writes to the optical disc 10 as is well understood. The optical disc player 28 further may include an interrogator 32, such as an interrogator sold by INTERMEC or the like. It should be appreciated that while the interrogator 32 is shown inside the optical disc player 28, the interrogator 32 could be a hand held, portable, or stationary unit positioned outside the optical disc player 28.

The optical disc player 28 may have a processor, such as a CPU 34 that controls the interrogator 32 and the laser head 30. The CPU 34 may further communicate to a remote location through a modem 36. Alternatively, or additionally, the interrogator 32 may also have a modem 38 for communication to a remote location. In both instances, the remote location may be connected to through a network such as the Internet, the PSTN, or other communication network. The modems 36 and 38 may each be a wireless modem, an ISDN modem, a phone line modem, a cable modem, or the like as needed or desired. The modem 38 may be duplicative in the instance where the interrogator 32 is built into the optical disc reader 28, and is more likely to be present when the interrogator 32 is a distinct entity from the optical disc reader 28.

It should be appreciated that the components of FIG. 3 may be further rearranged. For example, a conventional personal computer with a DVD/CDRW drive and an interrogator associated therewith is particularly contemplated for use with the present invention.

Figure 4:
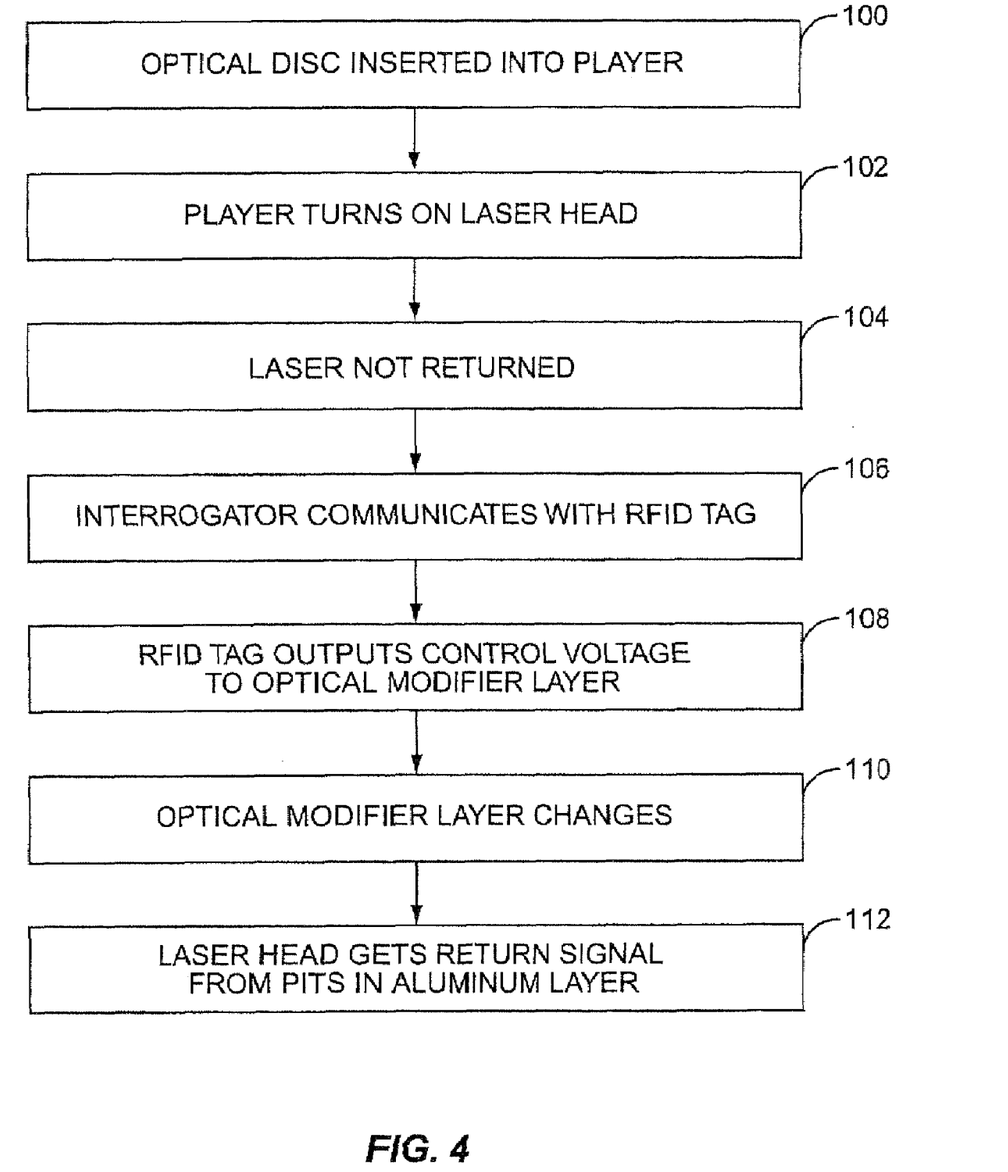
FIG. 4 illustrates a flow chart generally outlining an exemplary use of the present invention.

A general use of the present invention is illustrated in FIG. 4, with particularly contemplated embodiments being presented in FIGS. 5-9. Initially, an optical disc 10 according to the present invention is placed into an optical disc player 28 (block 100). The optical disc player 28 turns on the laser head 30 (block 102). The voltage controlled optical modifier layer 24 is initially opaque or otherwise diffuses the laser from the laser head 30, and thus the laser is not returned to the laser head 30 for interpretation (block 104).

The interrogator 32 is also turned on and communicates with the RFID tag 18 on the optical disc 10 (block 106). This interrogation may occur concurrently with the initial use of the laser, before the laser head 30 is turned on, or subsequently as needed or desired. In response to the presence of an interrogation signal from the interrogator 32, the RFID tag 18 outputs a voltage to the voltage controlled optical modifier layer 24 (block 108).

The voltage applied to the voltage controlled optical modifier layer 24 causes the characteristics of the voltage controlled optical modifier layer 24 to change (block 110) such that the pits in the aluminum layer 22 are now readable by the laser. The laser head 30 now gets a return signal from the laser bouncing off the pits in the aluminum layer 22 (block 112). The return signal is demodulated and interpreted as is conventional, and the optical disc player 28 provides the signal to an output device for playback or the like as needed or desired. Note that it is possible that the optical disc player 28 will always get a return signal at the laser head 30 if the interrogation signal is sent at the appropriate time. Variations on this process include requiring a continuous interrogation signal from the interrogator 32 such that if the interrogation signal is ever absent, the optical disc 10 becomes unreadable again.

Figure 10:
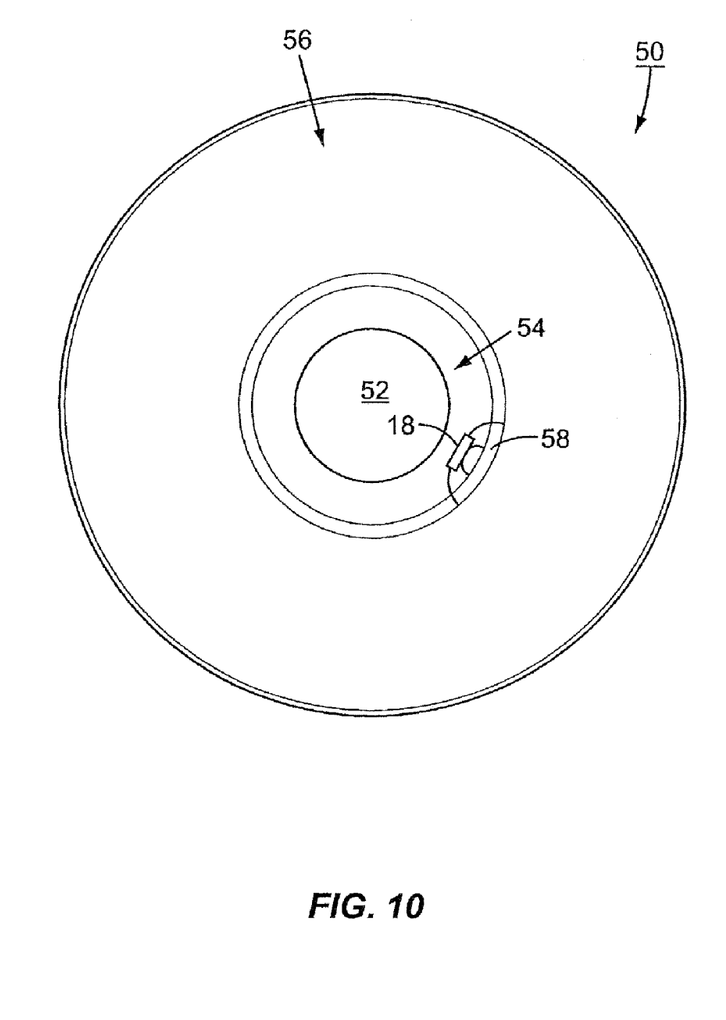
FIG. 10 illustrates an optical disc with an all optical portion for security purposes.

Alternatively, the voltage controlled optical modifier layer 24 may remain modified for a predetermined amount of time corresponding to a single playing of the contents of the optical disc 10, or other time frame as needed or desired. In an exemplary embodiment of this concept, the RFID tag 18 may be associated with a capacitor (not shown) that the RFID tag 18 charges to a known threshold voltage. The threshold voltage is applied to the voltage controlled optical modifier layer 24 and kept in a condition that allows the optical disc 10 to be read. A resistor or other mechanism may be used to slowly discharge the capacitor over time. In a preferred embodiment, the rate of discharge is selected so that a predefined time elapses before the voltage controlled optical modifier layer 24 changes to a state in which the optical disc 10 is not readable. As another option, the RFID tag 18 may store enough charge in a capacitor to drive a low energy clock device that counts cycles until a predetermined time period has elapsed, at which time the RFID tag 18 may discharge the capacitor or otherwise modify the behavior of the voltage controlled optical modifier layer 24. As yet another option, if the optical disc 10 included a photo-voltaic layer (as illustrated in FIG. 10), the use of the laser could remove charge from the layer, Thus, after a number of usages of the optical disc 10, the layer would be discharged and the optical disc 10 would be unreadable. A filter could be used to insure that the laser, and not sunlight, discharged the photo-voltaic layer. Still other time delay discharge mechanisms could be used as needed or desired.

As yet another option, the presence of a proper interrogation signal may cause the RFID tag 18 to instruct the voltage controlled optical modifier layer 24 to change permanently such that no further interrogation is required to use the optical disc 10. These concepts will be explored in greater detail below with respect to FIGS. 5-9.

Figure 5:
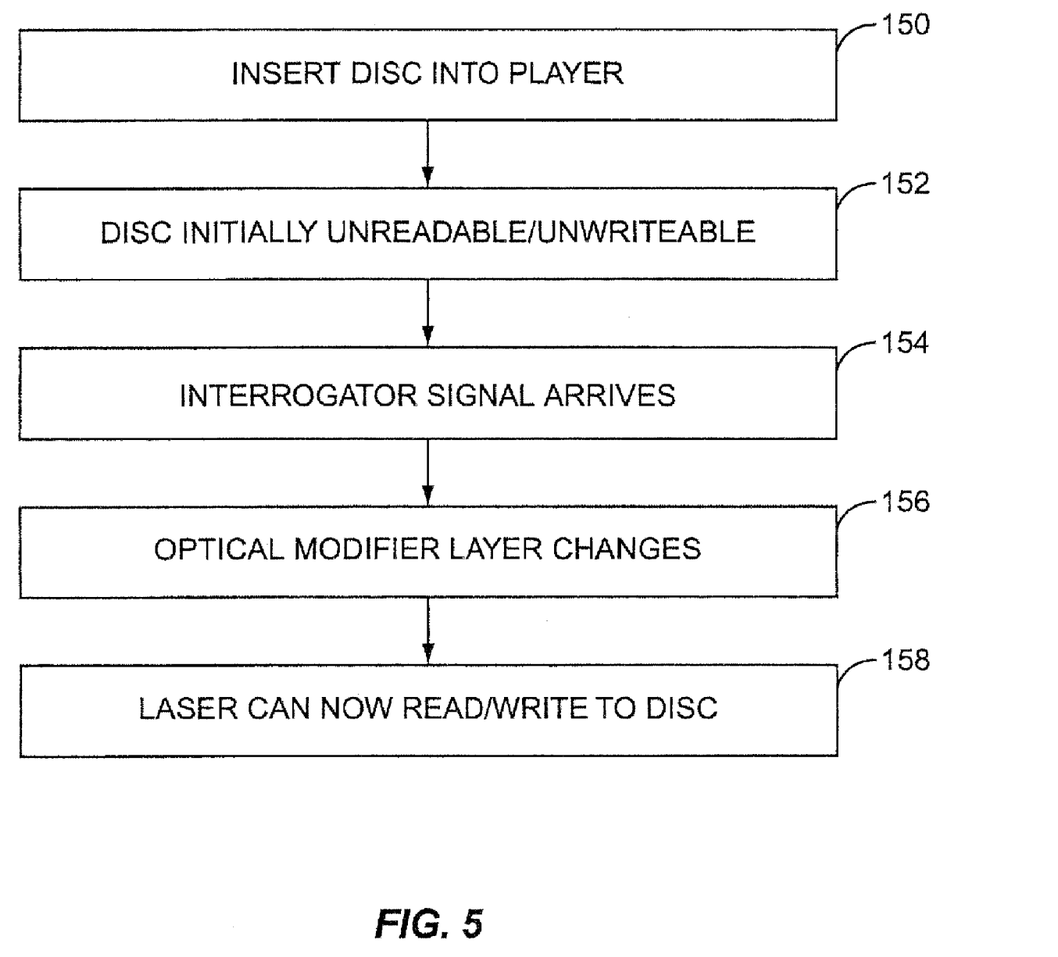
FIG. 5 illustrates a flow chart outlining use of the present invention with optical discs containing sensitive information.

The embodiment disclosed in FIG. 5 is appropriate for any situation where an optical disc 10 contains or will contain sensitive or confidential information. Such situations include personal information, financial information, and/or military or government information. Initially, the optical disc 10 is placed into an optical disc player 28 (block 150). The optical disc 10 is initially non-useable by the optical disc player 28. Specifically, the optical disc player 28 may not read the optical disc 10 nor write to the optical disc 10 (block 152). The user may then introduce an interrogation signal through an interrogator 32 (block 154). The interrogator 32 may be integral with the optical disc player 28 or an external device, such as a battery powered key held near the optical disc player 28 and sending the interrogation signal through the walls of the optical disc player 28 to the RFID tag 18. With the presence of the interrogation signal, the RFID tag 18 outputs a voltage and changes the optical qualities of the voltage controlled optical modifier layer 24 (block 156).

If the optical disc 10 is a write once, read only, or read-write disc, these abilities are enabled in the presence of the interrogation signal (block 158). In the event that the optical disc 10 is a write once disc, a memory (not shown) may be used to track whether or not the disc has been written on. The memory may interface with the RFID tag 18 such that the optical disc 10 may not have another write command executed thereon.

Figure 6:
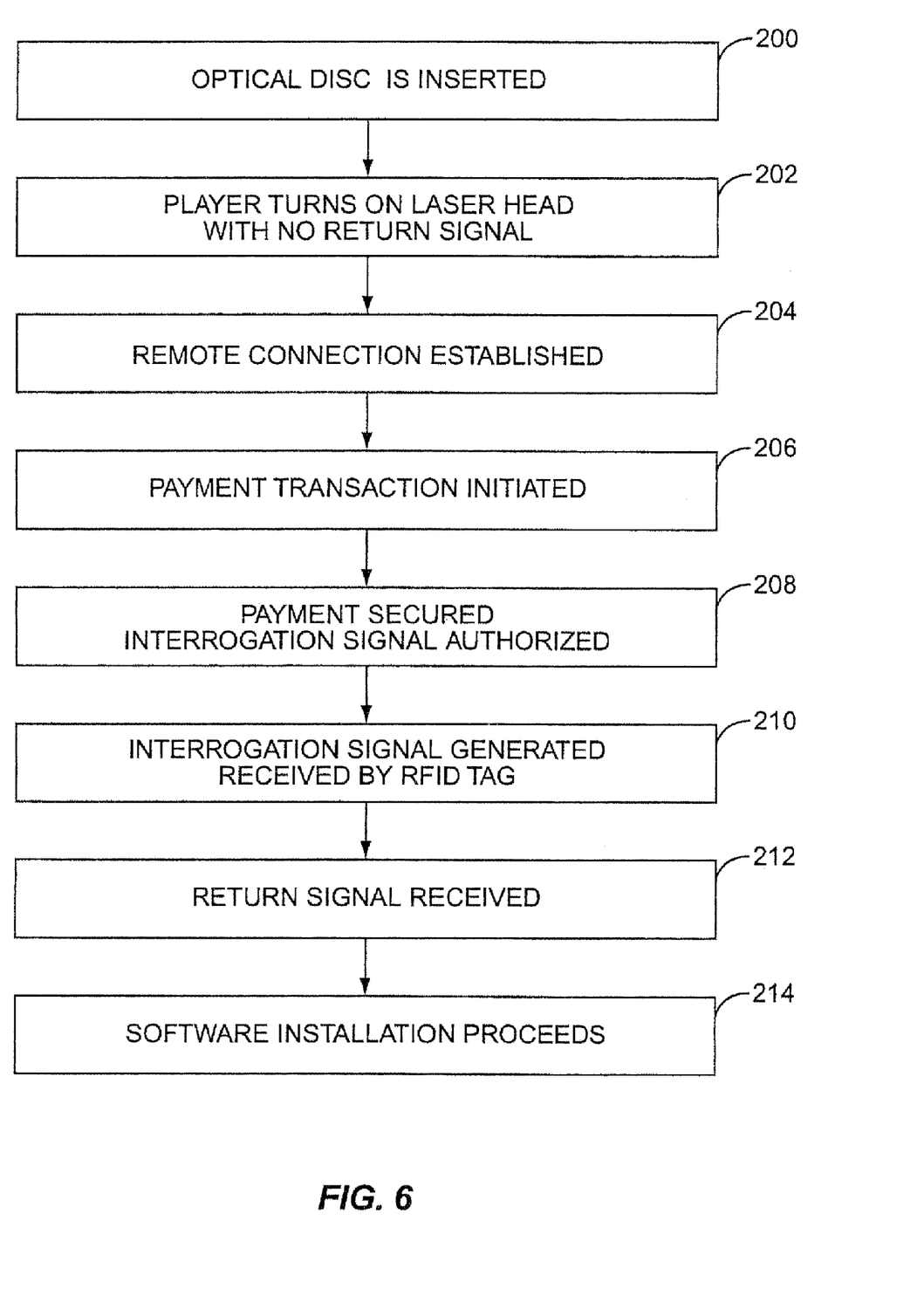
FIG. 6 illustrates a flow chart outlining use of the present invention for software authentication and payment via a network.

FIG. 6 illustrates an embodiment wherein software is authenticated and paid for via a network, such as the Internet. In this embodiment, the optical disc player 28 or the interrogator 32 may have a connection to a remote location, such as modems 36 and/or 38 or network connections. An optical disc 10 is inserted into the optical disc player 28 (block 200). The optical disc player 28 turns on the laser head 30 and fails to detect a return signal (block 202). The CPU 34 may detect this failed return signal and generate a command that a connection be made to a remote location over the network (block 204) so that an authorization to use the optical disc 10 may be secured. The address or contact information for the remote location may be located on a portion of the optical disc 10 that is not occluded by the voltage controlled optical modifier layer 24. Alternatively, the optical disc player 28 and/or interrogator 32 may connect automatically to a particular remote location. The remote location may query the CPU 34 or other device to determine what sort of command triggered the activation of the optical disc player 28. If the command was an installation command or a play command, the process may continue. If, however, the command was a copy command, the process may terminate.

The remote location initiates a payment transaction (block 206). Thus, payment information may be secured from the individual trying to use the optical disc 10. Payment information may be secured through a credit card reader, manual entry through a keyboard, or other appropriate means as needed or desired. Payment may be made on a pay per use schedule, a pay per installation schedule, or other schedule as needed or desired. Upon satisfaction that payment has been secured, the remote location may send a signal to the interrogator 32 to generate an appropriate interrogation signal (block 208). This signal may be routed through the CPU 34 or directly to the interrogator 32 as needed or desired and depending on the existence of the modem 38. The interrogation signal is generated, and the RFID tag 18 receives the interrogation signal (block 210). The voltage controlled optical modifier layer 24 changes and the laser head 30 generates a return signal (block 212). The installation or playing of the contents of the optical disc 10 may proceed (block 214).

Figure 7:
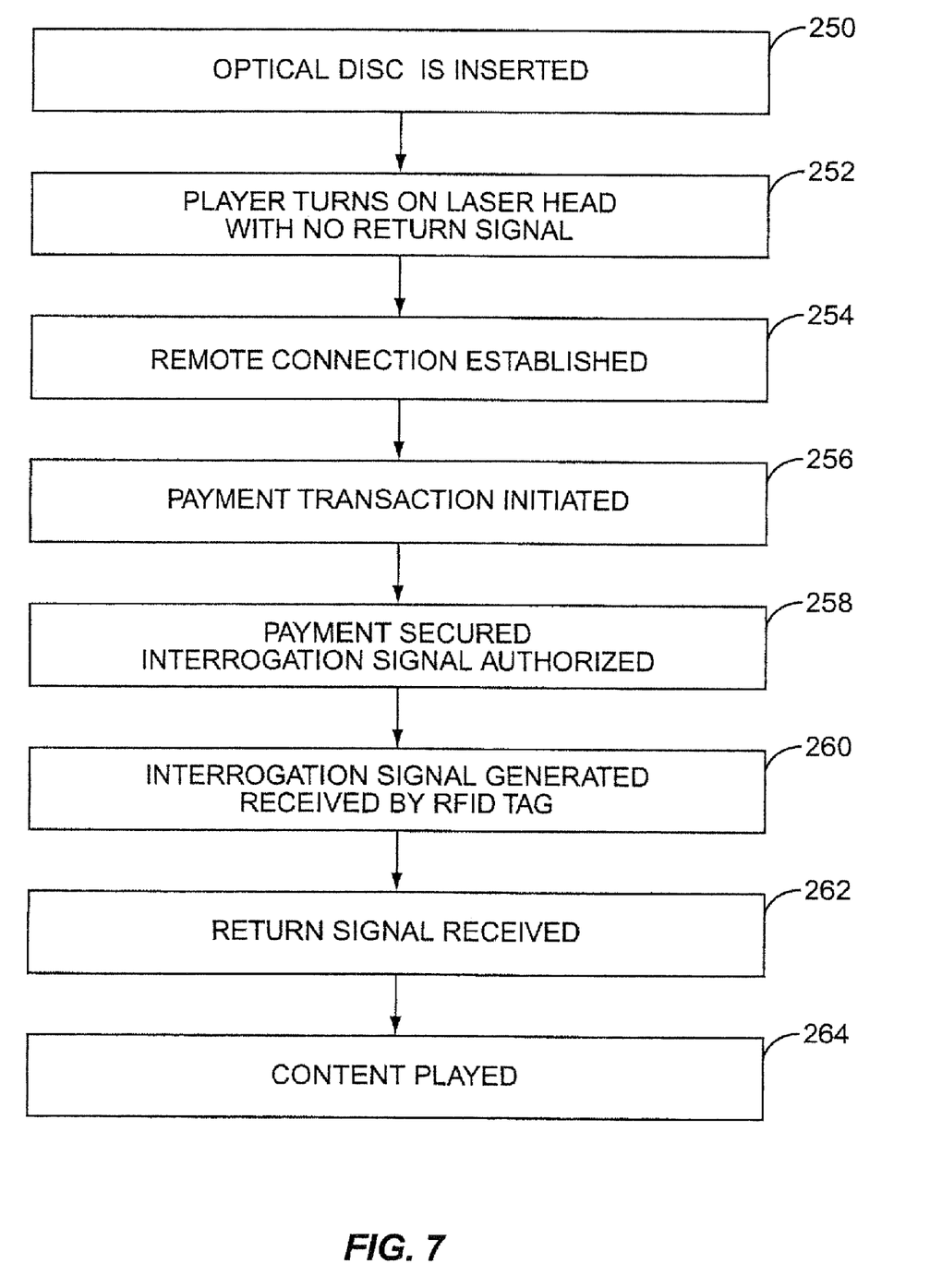
FIG. 7 illustrates a flow chart outlining use of the present invention in a pay per play activity.

In a similar vein, the present invention may be used to authorize pay per view movies or other pay per play activities. This is illustrated in FIG. 7. The process is very similar in that the optical disc 10 is inserted into the optical disc player 28 (block 250). The optical disc player 28 turns on the laser head 30 with a command to read the optical disc 10 and receives no return signal (block 252). Recognizing the absence of a return signal, the CPU 34 or other entity establishes a remote connection (block 254). The address or contact information for the remote location may be located on a portion of the optical disc 10 that is not occluded by the voltage controlled optical modifier layer 24. Alternatively, the optical disc player 28 and/or interrogator 32 may connect automatically to a particular remote location.

Once in communication with the remote location, a payment transaction may be initiated (block 256) to authorize a single playing of the content on the optical disc 10. The remote location may query the CPU 34 to see if the user is in fact trying to play the optical disc 10 or copy the optical disc 10. If the latter, the payment transaction may be canceled or never initiated. In this manner, copying may be hindered.

Once payment is secured, the remote location may authorize the interrogation signal (block 258). Payment information may be secured through a credit card reader, manual entry through a keyboard, or other appropriate means as needed or desired. Payment may be made on a pay per use schedule, a pay per installation schedule, or other schedule as needed or desired. The interrogator 32 generates the interrogation signal, which is received by the RFID tag 18 on the optical disc 10 (block 260). The RFID tag 18 outputs the needed voltage to change the properties of the voltage controlled optical modifier layer 24, and the laser may now generate a return signal that is received by the laser head 30 (block 262). The content on the optical disc 10 may then be played (block 264). A memory associated with the CPU 34, the interrogator 32, or the RFID tag 18 may track when it is appropriate for the voltage output by the RFID tag 18 to change such that the optical disc 10 is no longer readable, i.e., after one playing of the content.

Figure 8:
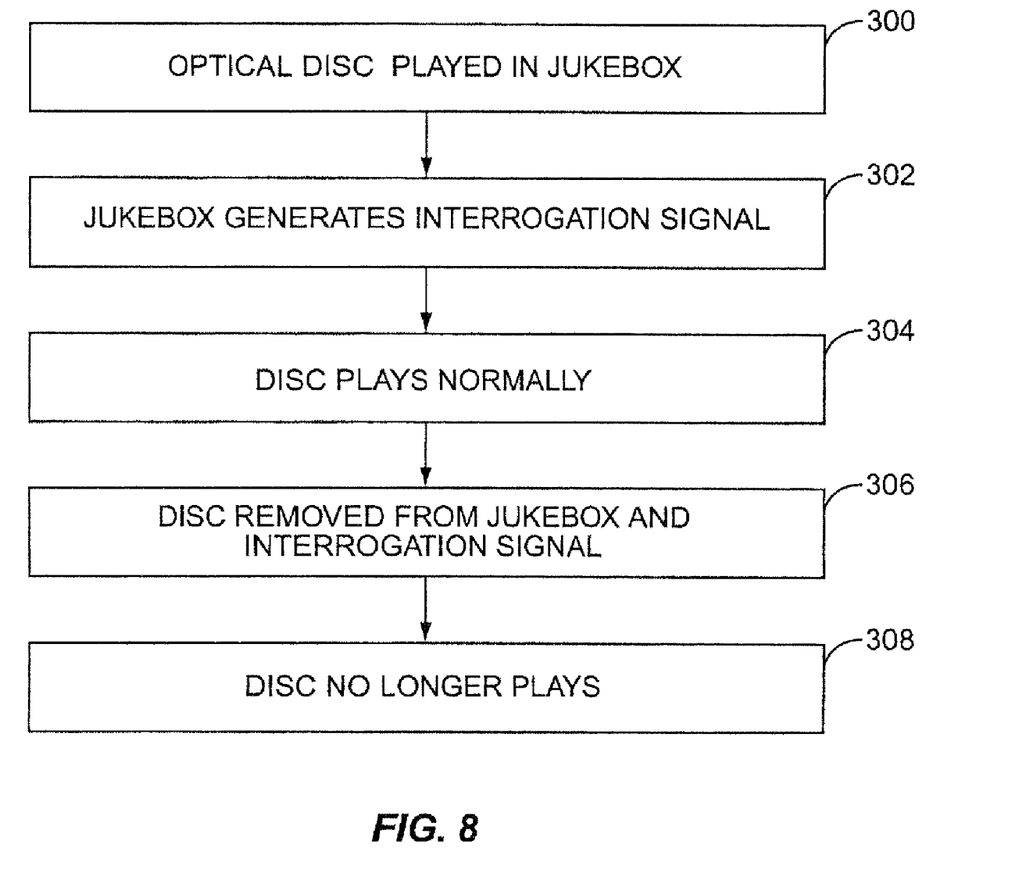
FIG. 8 illustrates a flow chart outlining use of the present invention in a jukebox activity.

Still another embodiment is illustrated in FIG. 8, wherein a jukebox (not specifically illustrated) or similar playing device may contain a plurality of optical discs 10 with content thereon. Each of these optical discs 10 represents an investment, which if stolen would financially injure the jukebox operator. For the purposes of this embodiment, the jukebox is analogous to the optical disc player 28, as the jukebox would contain an optical disc player 28 to function. To help prevent such theft, the present invention is useful. The optical discs 10 are placed in the jukebox (block 300). The jukebox may generate the desired interrogation signal throughout the jukebox (block 302). Alternatively, the interrogation signal may be limited to the area in and around the optical disc player 28 within the jukebox. In either event, the optical discs 10 play normally (block 304) while within the jukebox. At some point, an optical disc 10 may be removed from the jukebox, and thus removed from the presence of the interrogation signal (block 306). In the absence of the interrogation signal, the RFID tag 18 on the optical disc 10 does not generate the needed output voltage to change the optical qualities of the voltage controlled optical modifier layer 24, and thus the optical disc 10 no longer plays (block 308). While this does not prevent theft, it removes the incentive for the theft because the thief no longer has a usable optical disc 10, nor will anyone buy such a non-functioning optical disc 10.

Figure 9:
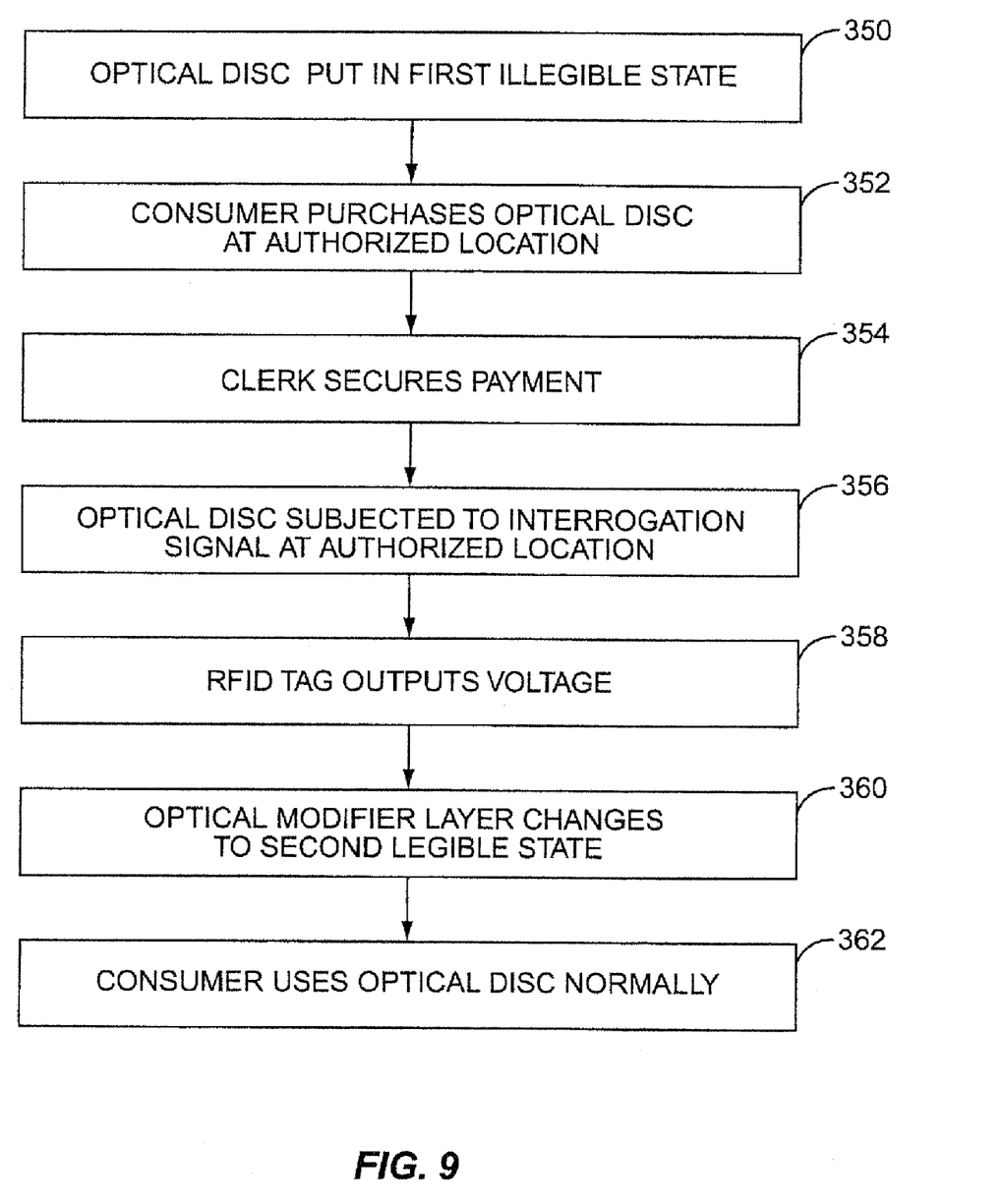
FIG. 9 illustrates a flow chart outlining use of the present invention in a retail anti-theft activity.

Another embodiment is illustrated in FIG. 9. This embodiment is directed to helping reduce or prevent theft in a retail environment. This embodiment requires that the voltage controlled optical modifier layer 24 be stable at two different states. The first state causes the aluminum layer 22 to be illegible. The second state allows the aluminum layer 22 to be legible. More information on bi-stable materials may be found in the previously incorporated '834 British patent. Either state should be able to be maintained absent a signal from the RFID tag 18, but a signal from the RFID tag 18 may cause the voltage controlled optical modifier layer 24 to transition between these two states. The use of this two state voltage controlled optical modifier layer 24 begins when the optical disc 10 is put in the first illegible state (block 350). This may be done during manufacturing, arrival at a retail environment, or other time as needed or desired.

A consumer purchases the optical disc 10 at an authorized location (block 352). This may entail picking the optical disc 10 off a rack in a store and approaching a cash register location or similar activity as is well understood. The clerk at the retail establishment secures payment for the optical disc 10 (block 354). Payment may be made through any conventional technique such as cash, check, credit card, debit card, or the like. The clerk then subjects the optical disc 10 to an interrogation signal generated proximate the authorized location (block 356). The interrogation signal may be generated by a portable, handheld interrogator 32, or the interrogator 32 may be integrated into a point of sale device such as a cash register or the like as needed or desired.

The RFID tag 18 receives the interrogation signal and outputs a voltage to the voltage controlled optical modifier layer 24 (block 358). The voltage controlled optical modifier layer 24 changes to the second, legible state (block 360), and the consumer may use the optical disc 10 normally (block 362). The voltage controlled optical modifier layer 24 stays in the second legible state indefinitely.

The present invention is not limited to simply changing the voltage controlled optical modifier layer 24 as described with respect to FIG. 8, but may also be combined with an electronic article surveillance (EAS) function, stock control, or logistics. If, for example, the RFID tag 18 operates at a center frequency of 13.56 MHz, when the interrogation signal is sent to the RFID tag 18 in block 356 to make the disc legible, a flag may also be set in the memory of the RFID tag 18. This flag may indicate that the optical disc 10 has been legitimately purchased. Still other flags may be set, or incorporated into the first flag. The other flags may indicate from whence the optical disc 10 was purchased as well as timestamp. Scanners at the store exit will sound an alarm if an RFID tag 18 with the incorrect flag is detected. Such scanners and flag setting are common in the EAS art. This adds to the security and also helps prevent theft where a product is taken from the shelves and then taken directly to a refund station, with a claim that the receipt has been lost. The dual security measures may be a powerful deterrent to theft.

Note that the embodiment of FIG. 9 may also be used in other non-retail establishments, such as a library for example, and need not be restricted to retail establishments. Further, while this embodiment does not prevent theft of the optical discs 10 per se, it does remove the incentive for the theft as the optical disc 10 is worthless if the interrogation signal has not been applied to change the voltage controlled optical modifier layer 24 to its second, legible state.

Numerous variations to the concept are possible. For example, the concept may also be applied to optical memory cards, such as those used by the United States Department of Defense. Another option is the all-optical tag/disc 50 as illustrated in FIG. 10. Such an optical disc 50 is similar to an optical disc 10 in that it contains a center hole 52, an non-information bearing annulus 54, and an information bearing annulus 56. An RFID tag 18 may be positioned on the optical disc 50 as previously described and connected to an voltage controlled optical modifier layer 24 as previously described. Further, the RFID tag 18 may be connected to a photo-voltaic area 58 of amorphous silicon or a polymeric semiconductor. Alternatively, the photo-voltaic area 58 may be a pyroelectric area. To use the optical disc 50, an optical disc writer must first attempt to write a specified code to the photo-voltaic area 58, producing a voltage which powers up the RFID tag 18. The modulation of the laser provides a data input to the RFID tag 18, which, if correct, allows the RFID tag 18 to either clear the voltage controlled optical modifier layer 24 temporarily for reading, or by using the bi-state stable material discussed above, permanently enables the use of the optical disc 50. This technique may be used by itself or in conjunction with an interrogation signal as needed or desired for flexibility in assigning security protocols or the like.

Note further that while in general the presence or absence of an interrogation signal has been used to trigger the RFID tag 18 to send the voltage signal to the voltage controlled optical modifier layer 24, it is also possible that the RFID tag 18 may be interrogated and respond in a normal fashion until the interrogator 32 sends a predefined data sequence which causes the RFID tag 18 to accept commands. After receipt and acknowledgment of this predefined data sequence, the interrogator 32 may send a command to the RFID tag 18 to provide the desired output voltage that causes the change in the voltage controlled optical modifier layer 24.

Note that while the present discussion has been phrased in terms of disabling an entire optical disc 10, it is possible that only a portion of the optical disc 10 may be disabled to achieve the same results. For example, disabling the country code and index information on a DVD may make the DVD unreadable and achieve the same results.

Those skilled in the art will recognize improvements and modifications to the preferred embodiments of the present invention. All such improvements and modifications are considered within the scope of the concepts disclosed herein and the claims that follow.

What is claimed is:

1. A method of inhibiting theft of an optical disc from an establishment, comprising:
    attaching an RFID tag to the optical disc, wherein the RFID tag controls an optical modifier layer on the optical disc, and wherein the optical modifier layer exists in a first state that renders at least a portion of the optical disc illegible to an optical disc reader; and
    configuring the RFID tag to receive a signal indicating that use of the optical disc is authorized and, in response to receiving the signal, to cause the optical modifier layer to modify to a second state in which the optical disc is legible to an optical disc reader.

2. The method of claim 1, further comprising configuring the RFID tag with a flag in a memory associated with the RFID tag, wherein, in response to receiving the signal, the flag is set.

3. The method of claim 2, wherein the flag, when set in the memory, indicates that use of the optical disc has been authorized.

4. The method of claim 3, further comprising configuring the memory to store an indication of a location where use of the optical disc was authorized.

5. The method of claim 3, further comprising configuring the memory to store a timestamp indicating when use of the optical disc was authorized.

6. The method of claim 1, wherein the optical modifier layer is modified to the second state temporarily.

7. The method of claim 1, wherein the optical modifier layer is modified to the second state indefinitely.

8. A method of accessing a content layer of an optical disc having a theft-inhibiting optical modifier layer that controls access to the content layer, the method comprising:
    loading the optical disc into an electronic apparatus configured to optically access the content layer, wherein the optical disc has an RFID tag, which indicates use of the optical disc is authorized associated therewith that controls the theft-inhibiting optical modifier layer; and
    sending a signal to the RFID tag to cause the theft-inhibiting optical modifier layer to modify from a first state to a second state, wherein in the first state the optical modifier layer renders at least a portion of the content layer optically inaccessible by the electronic apparatus and in the second state the optical modifier layer permits optical access to the content layer.

9. The method of claim 8, wherein sending the signal to the RFID tag comprises sending an interrogation signal from an interrogator integrated into the electronic apparatus that optically accesses the content layer.

10. The method of claim 8, wherein sending the signal to the RFID tag comprises sending an interrogation signal from a portable interrogator.

11. The method of claim 8, wherein the optical modifier layer is modified to the second state temporarily.

12. The method of claim 8, wherein the optical modifier layer is modified to the second state indefinitely.

13. The method of claim 8, wherein the electronic apparatus is an optical disc drive.

14. A system for inhibiting theft of an optical disc from an establishment, comprising:
    an optical disc comprising a content layer and an optical modifier layer wherein the content layer is optically accessible through the optical modifier layer
    an RFID tag attached to the optical disc and associated with the optical modifier layer; and
    an interrogator configured to send an interrogation signal to the RFID tag in connection with a transaction that authorizes use of the optical disc, wherein the RFID tag is configured to output an electrical signal to the optical modifier layer in response to receiving the interrogation signal,
    wherein the electrical signal causes the optical modifier layer to modify from a first state to a second state, wherein in the first state the optical modifier layer renders at least a portion of the content layer optically inaccessible and in the second state the optical modifier layer permits optical access to the content layer.

15. The system of claim 14, wherein the interrogator is integrated into a point-of-sale device.

16. The system of claim 14, wherein the interrogator is a portable interrogator configured for use in conducting the transaction.

17. The system of claim 14, wherein the electrical signal is further configured to set a flag in a memory associated with the RFID tag indicating that use of the optical disc is authorized.

18. The system of claim 17, further comprising a scanner positioned near an exit of the establishment, wherein the scanner is configured to communicate with the RFID tag to determine whether use of the optical disc has been authorized.

19. The system of claim 18, wherein the scanner is further configured to set an alarm if the scanner detects an optical disc for which use of the optical disc is not authorized.

20. The system of claim 14, wherein the optical modifier layer is a voltage-controlled optical modifier layer, and wherein the RFID tag is configured to output a voltage signal to the optical modifier layer that causes the optical modifier layer to modify from the first state to the second state.

21. A method of inhibiting theft of an optical disc from an establishment, comprising:
    obtaining an optical disc with an RFID tag attached thereto, wherein the RFID tag is configured to control an optical modifier layer on the optical disc, and wherein the optical modifier layer exists in a first state that renders at least a portion of the optical disc illegible to an optical disc reader; and
    after use of the optical disc is authorized, sending a signal to the RFID tag to cause the optical modifier layer to modify to a second state in which the optical disc is legible to an optical disc reader.

22. The method of claim 21, wherein sending a signal to the RFID tag on the optical disc comprises sending an interrogation signal from an interrogator integrated into a point-of-sale device.

23. The method of claim 21, wherein sending a signal to the RFID tag on the optical disc comprises sending an interrogation signal from a portable interrogator.

24. The method of claim 21, wherein sending a signal comprises sending an interrogation signal at a frequency centered around a frequency selected from the group consisting of: 125 kHz, 13.56 MHz, 915 MHz, and 2450 MHz.

25. The method of claim 21, further comprising setting a flag in a memory associated with the RFID tag.

26. The method of claim 25, wherein setting the flag in the memory indicates that use of the optical disc has been authorized.

27. The method of claim 26, further comprising storing in the memory an indication of a location where use of the optical disc was authorized.

28. The method of claim 26, further comprising storing in the memory a timestamp indicating when use of the optical disc was authorized.

29. The method of claim 26, further comprising interrogating the RFID tag to determine whether use of the optical disc was authorized.

30. The method of claim 29, wherein the RFID tag is interrogated near an exit of the establishment.

31. The method of claim 30, further comprising setting an alarm if said interrogation determines that use of the optical disc was not authorized.

32. The method of claim 29, wherein the RFID tag is interrogated in connection with a refund transaction prior to issuing a refund.

33. The method of claim 21, wherein use of the optical disc is authorized as a result of selling the optical disc.

34. The method of claim 21, wherein use of the optical disc is authorized as a result of lending the optical disc.

35. The method of claim 21, wherein the optical modifier layer is modified to the second state temporarily.

36. The method of claim 21, wherein the optical modifier layer is modified to the second state indefinitely.

* * * * *

UNITED STATES PATENT AND TRADEMARK OFFICE
CERTIFICATE OF CORRECTION

PATENT NO. : 7,447,143 B2  Page 1 of 1
APPLICATION NO. : 11/469318
DATED : November 4, 2008
INVENTOR(S) : I. J. Forster et al.

It is certified that error appears in the above-identified patent and that said Letters Patent is hereby corrected as shown below:

On the Title Pg.

| | | |
|---|---|---|
| Item (75) | Inventors | "Ian J Forster," should read<br>--Ian J. Forster,-- |
| Item (75) | Inventors | "Michael G Ginn," should read<br>--Michael G. Ginn,-- |
| Col. 10 | line 11 | "accessible through the optical modifier layer" should read --accessible through the optical modifier layer;-- |

Signed and Sealed this

Eighth Day of September, 2009

David J. Kappos
*Director of the United States Patent and Trademark Office*